US010808615B2

(12) United States Patent
Kustura et al.

(10) Patent No.: US 10,808,615 B2
(45) Date of Patent: Oct. 20, 2020

(54) MODULAR CHILLER PLANT

(71) Applicant: Stellar Energy Americas, Inc., Jacksonville, FL (US)

(72) Inventors: Marija Kustura, Jacksonville, FL (US); Curtis Lovelace, Jacksonville, FL (US); Jasen Wilkinson, Middleburg, FL (US)

(73) Assignee: Stellar Energy Americas, Inc., Jacksonville, FL (US)

( * ) Notice: Subject to any disclaimer, the term of this patent is extended or adjusted under 35 U.S.C. 154(b) by 0 days.

(21) Appl. No.: 15/257,787

(22) Filed: Sep. 6, 2016

(65) Prior Publication Data

US 2017/0067396 A1 Mar. 9, 2017

Related U.S. Application Data

(60) Provisional application No. 62/214,468, filed on Sep. 4, 2015.

(51) Int. Cl.
*F02C 7/141* (2006.01)
*B23P 15/26* (2006.01)
(Continued)

(52) U.S. Cl.
CPC .............. *F02C 7/141* (2013.01); *B23P 15/26* (2013.01); *F02C 7/04* (2013.01); *F25D 19/04* (2013.01);
(Continued)

(58) Field of Classification Search
CPC .. F02C 7/141; F02C 7/04; F25D 19/04; F25D 17/02; F24F 3/001; F25B 2400/21; B23P 15/26; F05D 2220/32; F05D 2260/213
See application file for complete search history.

(56) References Cited

U.S. PATENT DOCUMENTS 1,781,541 A 11/1930 Einstein et al.
2,336,066 A 12/1943 Cain
(Continued)

FOREIGN PATENT DOCUMENTS

GB 2 175 679 A 12/1986
JP H11-173161 A 6/1999
WO WO-2007/149473 A2 12/2007

OTHER PUBLICATIONS

1991 ASHRAE Handbook, "Chapter 39: Thermal Storage," ASHRAE Journal, 1991.
(Continued)

*Primary Examiner* — Larry L Furdge
(74) *Attorney, Agent, or Firm* — Venable LLP; Michele V. Frank

(57) ABSTRACT

A chiller plant includes a first pump module having at least one first pump module wall; a second pump module having at least one second pump module wall; and a plurality of chiller modules each having at least one chiller module wall. The first pump module, the second pump module, and the plurality of chiller modules may be placed together to form the chiller plant. The at least one first pump module wall, the at least one second pump module wall, and the chiller module walls may collectively form a perimeter wall around at least a portion of the chiller plant. Other embodiments of the chiller plant, and methods for its use, are described herein.

20 Claims, 6 Drawing Sheets

(51) Int. Cl.
F02C 7/04 (2006.01)
F25D 19/04 (2006.01)
F24F 3/00 (2006.01)
F25D 17/02 (2006.01)

(52) U.S. Cl.
CPC .... F05D 2220/32 (2013.01); F05D 2260/213 (2013.01); F24F 3/001 (2013.01); F25B 2400/21 (2013.01); F25D 17/02 (2013.01)

(56) References Cited

U.S. PATENT DOCUMENTS

| | | |
|---|---|---|
| 2,689,467 A | 9/1954 | Verber |
| 3,148,513 A | 9/1964 | Ewing |
| 4,244,191 A | 1/1981 | Hendriks |
| 4,244,517 A | 1/1981 | Stanke et al. |
| 4,418,527 A | 12/1983 | Schlom et al. |
| 4,446,703 A | 5/1984 | Gilbertson |
| 4,463,574 A | 8/1984 | Spethmann et al. |
| 4,483,152 A | 11/1984 | Bitondo |
| 4,792,091 A | 12/1988 | Martinez, Jr. |
| 4,926,649 A | 5/1990 | Martinez, Jr. |
| 4,951,460 A | 8/1990 | Prochaska et al. |
| 5,012,646 A | 5/1991 | Speer |
| 5,065,598 A | 11/1991 | Kurisu et al. |
| 5,083,423 A | 1/1992 | Prochaska et al. |
| 5,104,562 A | 4/1992 | Kardos et al. |
| 5,111,875 A | 5/1992 | Hammarstedt |
| 5,191,767 A | 3/1993 | Kane et al. |
| 5,203,161 A | 4/1993 | Lehto |
| 5,321,944 A | 6/1994 | Bronicki et al. |
| 5,386,685 A | 2/1995 | Frutschi |
| 5,444,971 A | 8/1995 | Holenberger |
| 5,457,951 A | 10/1995 | Johnson et al. |
| 5,465,585 A | 11/1995 | Mornhed et al. |
| 5,622,044 A | 4/1997 | Bronicki et al. |
| 5,632,148 A | 5/1997 | Bronicki et al. |
| 5,655,373 A | 8/1997 | Yamashita et al. |
| 5,758,502 A | 6/1998 | Utamura et al. |
| 5,782,093 A | 7/1998 | Yamashita et al. |
| 5,790,972 A | 8/1998 | Kohlenberger |
| 5,894,739 A | 4/1999 | Temos |
| 6,085,532 A | 7/2000 | Sibik |
| 6,173,563 B1 | 1/2001 | Vakil et al. |
| 6,185,946 B1 | 2/2001 | Hartman |
| 6,209,330 B1 | 4/2001 | Timmerman et al. |
| 6,301,897 B1 | 10/2001 | Uchida |
| 6,318,065 B1 | 11/2001 | Pierson |
| 6,324,867 B1 | 12/2001 | Fanning et al. |
| 6,405,549 B1 | 6/2002 | Baffes |
| 6,408,609 B1 | 6/2002 | Andrepont |
| 6,422,018 B1 | 7/2002 | Tisdale et al. |
| 6,470,686 B2 | 10/2002 | Pierson |
| 6,769,258 B2 | 8/2004 | Pierson |
| 6,848,267 B2 | 2/2005 | Pierson |
| 7,343,746 B2 | 3/2008 | Pierson |
| 7,644,573 B2 | 1/2010 | Smith et al. |
| 7,716,930 B2 | 5/2010 | Chillar et al. |
| 8,356,466 B2 | 1/2013 | Motakef et al. |
| RE44,079 E | 3/2013 | Pierson |
| RE44,815 E | 3/2014 | Pierson |
| 2004/0016245 A1* | 1/2004 | Pierson .................. F01K 23/10 62/175 |
| 2008/0127662 A1* | 6/2008 | Stanfield .................. F24F 3/06 62/175 |
| 2008/0276617 A1 | 11/2008 | Mak |
| 2011/0088399 A1 | 4/2011 | Briesch et al. |
| 2012/0297811 A1* | 11/2012 | Miglio ................. F25B 29/003 62/324.1 |

OTHER PUBLICATIONS

1992 ASHRAE Handbook, "Heating, Ventilating, and Air-Conditioning Systems and Equipment," ASHRAE Journal, 1992.
1993 ASHRAE Handbook, "Design Guide for Cool Thermal Storage," ASHRAE Journal, 1993.
1994 ASHRAE Handbook, "Refrigeration," ASHRAE Journal, 1994.
1995 ASHRAE Handbook, "Heating, Ventilating, and Air Conditioning: Applications," ASHRAE Journal, 1995.
1996 ASHRAE Handbook No. 1, "Heating, Ventilating, and Air-Conditioning: Systems and Equipment," ASHRAE Journal, 1996.
1996 ASHRAE Handbook No. 2, "Heating, Ventilating, and Air-Conditioning: Systems and Equipment," ASHRAE Journal, 1996.
1996 ASHRAE Handbook No. 3, "Heating, Ventilating, and Air-Conditioning: Systems and Equipment," ASHRAE Journal, 1996.
Andrepont, J. et al., "Summer Peaking Capacity Via Chilled Water Storage Cooling of Combustion Turbine Inlet Air," American Power Conference, 1994.
"Applications Engineering Manual: Multiple-Chiller-System Design and Control," Trane, 2001.
Cawley, M.F. et al., "Flow visualization of free convection in a vertical cylinder of water in the vicinity of the density maximum," International Journal of Heat and Mass Transfer, 2003.
Clark, K. M., P.E. et al., "The Application of Thermal Energy Storage for District Cooling and Combustion Turbine Inlet Air Cooling," International District Energy Association, 1998.
Coad, W.J., P.E. et al., "A Fundamental Perspective on Chilled Water Systems," McClure Engineering Associates, 1998.
"Cogeneration in Power Plants: Staying cool for cogen," Worlwide Independent Power, 2002.
Cross, J.K. et al., "Modeling of Hybrid Combustion Turbine Inlet Air Cooling Systems," ASHRAE Transactions: Symposia, 2005.
"Database of U.S. CHP Installations Incorporating Thermal Energy Storage and/or Turbine Inlet Cooling," The Cool Soulutions Company, 2003.
Dharmadhikari, S., Ph.D. et al., "Contribution of Stratified Thermal Storage to Cost-Effective Trigeneration Project," ASHRAE Transactions: Symposia, 2000.
"Distributed Energy Program Report: Database of U.S. Combined Heat & Power (CHP) Installations Incorporating Thermal Energy Storage (TES) and/or Turbine Inlet Cooling (TIC)," Cool Solutions Company, 2004.
Dorgan, C. et al, "Design Guide for Cool Thermal Storage: Chilled Water Storage," ASHRAE Journal, 1993.
Ferreira, J. et al., "Cold Production from Heat," Energie-Cites/Ademe, 1998.
Fiorino, D. et al., "Achieving High Chilled-Water Delta Ts," ASHRAE Journal, 1999.
Fiorino, D. et al., "Twenty-Five Ways to Raise Your Chilled-Water Temperature Differential," ASHRAE Transactions: Symposia, 1996.
Gidwani, B.N. et al., "Optimization of Chilled Water Systems," Proceedings from the Ninth Annual Industrial Energy Technology Conference, 1987.
Grimm, N. et al., "HVAC Systems and Components Handbook," McGraw-Hill Professional, 1997.
Hartman, T.B., P.E., "Design Issues of Variable Chilled-Water Flow Through Chillers," The Hartman Company, 1996.
Holman, J.P. et al., "Thermodynamics: Second Edition," McGraw-Hill Book Company, 1974.
"Industrial Refrigeration Rotary Screw Process Chillers," Dunham-Bush, 2000.
"Large Chillers: Series or Parallel Flow?," Trane Engineer's Newsletter, 1977.
MacCracken, C.D. et al., "An Overview of the Progress and the Potential of Thermal Storage in Off-Peak Turbine Inlet Cooling," ASHRAE Transactions: Symposia, 1994.
McQuay, "Chiller Plant Design Application Guide," McQuay International, 2001.
Merriam-Webster's Collegiate Dictionary, 11th Edition, Merriam-Webster, Incorporatedd, 2008.
Mornhed, G. et al., "Innovations in District Heating and Cooling 1984-1994 and Their Economic Impact," ASHRAE Transactions: Symposia, 1995.
Office of Energy Efficiency & Renewable Energy, "Database (Report) of U.S. CHP Installations Incorporating Thermal Energy Storage (TES) and/or Turbine Inlet Cooling (TIC), "Cool Solutions Company, 2004.

(56) References Cited

OTHER PUBLICATIONS

Office of Energy Efficiency & Renewable Energy, "U.S. CHP Installations Incorporating Thermal Energy Storage (TES) and/or Turbine Inlet Cooling (TIC)," Cool Solutions Company, 2003.
Ondryas, I. et al., "Options in Gas Turbine Power Augmentation Using Inlet Air Chilling," The American Society of Mechanical Engineers, 1990.
Polimeros, G. et al., "Energy Cogeneration Handbook," Industrial Press Inc, 1981.
Punwani, D. et al., "A Hybrid System for Combustion Turbine Inlet Air Cooling at the Calpine Clear Lake Cogeneration Plant in Pasadena, Texas," ASHRAE Winter Meeting, 2001.
Reddy, A. et al., "Determining Long-Term Performance of Cool Storage Systems from Short-Term Tests," ASHRAE Research Project 1004, 1998.
Reeves, G.A. et al., "Commercial Cool Storage Deisgn Guide," GPU Service Corporation, 1985.
Sanjeev, J., P.E., et al., "Capacity Enhancement of ABB 11N1 with Thermal Energy Storage," Power Gen International, 1999.
Sanjeev, J., P.E., et al., "Inlet Air Cooling for a Frame 7EA based Combined Cycle Power Plant," Power Gen International, 1997.
"Section 1: Purpose of System," jb1393.kmc.
Stewart, W.E. Jr. et al., "Design Guide: Combustion Turbine Inlet Air Cooling Systems," ASHRAE, 1999.
Stewart, W.E. Jr. et al., "Improved Fluids for Naturally Stratified Chilled Water Storage Systems," ASHRAE, 1998.
"TICA Meeting Notes," Turbine Inlet Cooling Association, 2001.
Tong, W. et al., "Density inversion effect on transient natural convection in a rectangular enclosure," University of Colorado Department of Aerospace Engineering Sciences, 1993.
Trane et al., "Trane Duplex Centrifrugal Water Chillers CDHF (60 Hz): 1500-2800 Tons CDHG (50 Hz): 1200-2500 Tons," The Trane Company, 1997.
"Turbine Inlet Chilling System: Qaseem Power Plant Extension," GE International Power Systems, 1997.
"Turbine Inlet Cooling Association Partial Databse of Turbine Inlet Cooling Installations," Turbine Inlet Cooling Association, 2012.
"Turbine Inlet Cooling Case Studies," Energy-Tech, 2004.
"Turbine Inlet Cooling Systems," Internet Archive website from turbineairsystems.com, 2000.
Vogelsang, M. et al., "CoolTools Chilled Water Plant Design and Specification Guide," Pacific Gas and Electric Company, 2000.
"Water-Cooled Reciprocating Packaged Water Chillers," McQuay International, 1997.
International Search Report dated Dec. 15, 2016 in International Patent Application No. PCT/US2016/050441.
Written Opinion dated Dec. 15, 2016 in International Patent Application No. PCT/US2016/050441.

\* cited by examiner

MODULAR CHILLER PLANT

CROSS-REFERENCE TO RELATED APPLICATIONS

This application claims priority to U.S. Provisional Application No. 62/214,468 filed Sep. 4, 2015, the disclosure of which is incorporated herein by reference in its entirety.

TECHNICAL FIELD

The present invention relates generally to chilling water and, more specifically, systems and methods for chilling water for use in turbine inlet cooling systems.

BACKGROUND

Systems for chilling water have been employed in various applications, such as, for example, turbine inlet air cooling in power producing plants, turbine drives in liquefied natural gas (LNG) plants, district cooling plants, process cooling, and other applications. Examples of turbine inlet cooling systems are disclosed in U.S. Provisional Application No. 62/069,633, filed Oct. 28, 2014, and 62/062,493, filed Oct. 10, 2014, and U.S. Patent Application Publication No. 2016/0102613, published on Apr. 14, 2016, the entire contents of which are incorporated herein by reference. Another example of a turbine inlet cooling system is disclosed in U.S. Pat. No. RE44,815, issued Mar. 24, 2014, the entire content of which is also incorporated herein by reference.

SUMMARY

According to an embodiment, a chiller plant may comprise a first pump module having at least one first pump module wall; a second pump module having at least one second pump module wall; and a plurality of chiller modules each having at least one chiller module wall, wherein the first pump module, the second pump module, and the plurality of chiller modules are placed together to form the chiller plant, wherein the at least one first pump module wall, the at least one second pump module wall, and the chiller module walls collectively form a perimeter wall around at least a portion of the chiller plant.

According to another embodiment, a method of assembling a chiller plant may comprise providing a first pump module having at least one first pump module wall; providing a chiller module having at least one chiller module wall adjacent to the first pump module; providing a second pump module having at least one second pump module wall adjacent to the chiller module; wherein the at least one first pump module wall, the at least one second pump module wall, and the chiller module wall collectively form a perimeter wall around at least a portion of the chiller plant.

BRIEF DESCRIPTION OF THE DRAWINGS

The features and advantages of the invention will be apparent from the following drawings wherein like reference numbers generally indicate identical, functionally similar, and/or structurally similar elements.

DETAILED DESCRIPTION

Embodiments of the invention are discussed in detail below. In describing embodiments, specific terminology is employed for the sake of clarity. For example, a chilled water system is used for illustrative purposes in the title and description of the embodiments of the present invention. However, the invention is not intended to be limited to the specific terminology so selected and may be configured for various applications. For example, another fluid, liquid, water solution, and/or medium may be used as a working fluid instead of water in the described system. Although various piping, valves, fitting, instrumentation, and other components may not be expressly described, it is foreseen that one of ordinary skill in the art may employ such components with the described embodiments without departing from the spirit and scope of the invention. A person skilled in the relevant art will recognize that other equivalent parts can be employed and other methods developed without departing from the spirit and scope of the invention.

Figure 1:
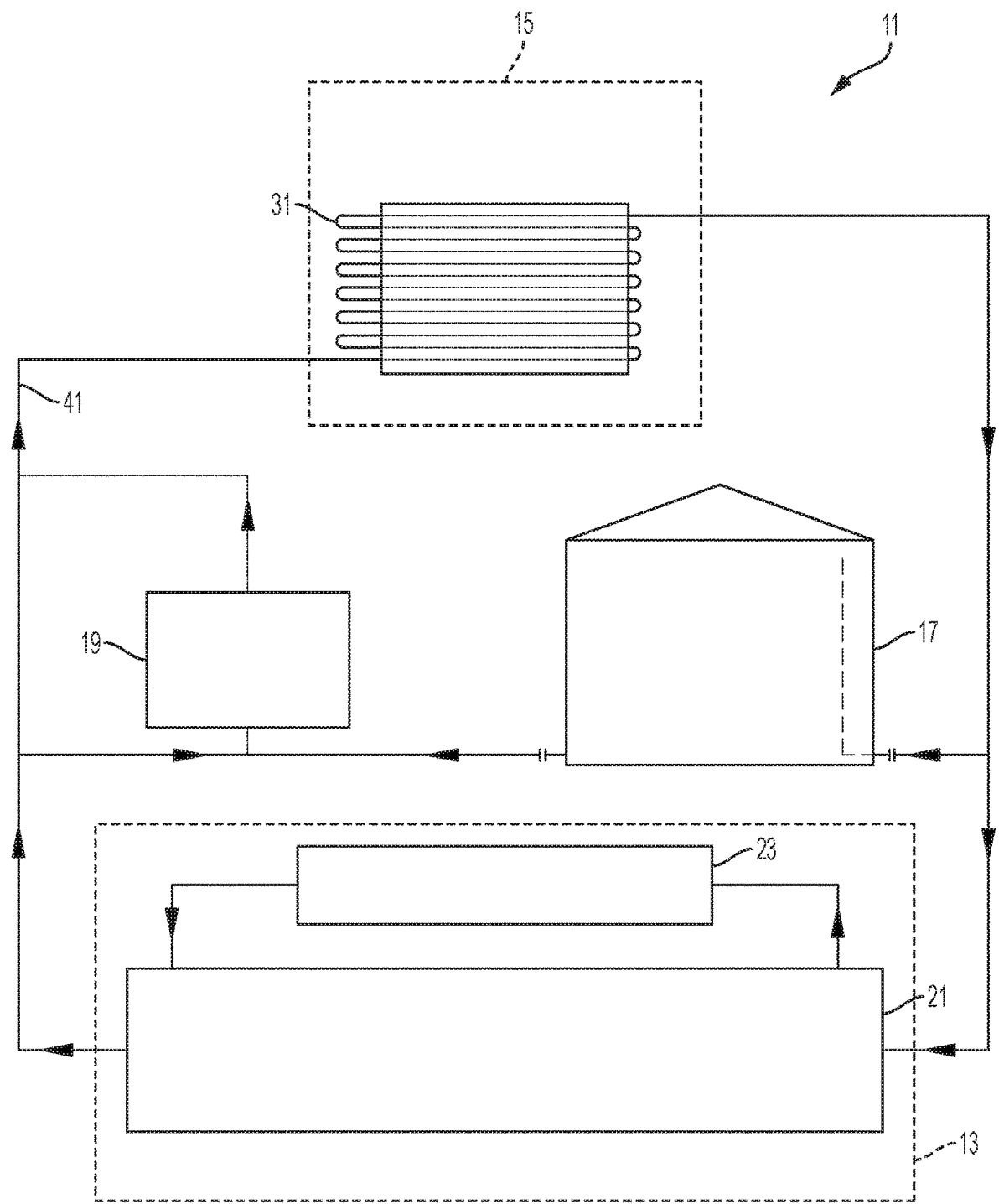
FIG. 1 is a flow schematic of an embodiment of a chilled water system.

An embodiment of a chilled water system 11 is illustrated at FIG. 1. The chilled water system 11 may generally comprise a chiller system 13 and a heat exchanger 15. The chilled water system 11 may further comprise, as optional components, a thermal energy storage tank 17, such as an insulated tank, and/or a secondary pump system 19 having one or more pumps. According to an embodiment, the one or more pumps may be any pump suitable for pumping fluid such as, for example, but not limited to, a centrifugal pump, a vertical inline or end suction pump, or a vertical turbine pump. According to an embodiment, the pumps may be constant speed pumps or may operate at a constant speed. According to another embodiment, the pumps may be variable speed pumps or may operate at variable speeds. According to an embodiment, the pumps may comprise a PACO® pump, an Armstrong® pump, or other device capable of conveying liquid or fluid. According to an embodiment where more than one pump is provided, the pumps may be arranged in parallel. For example, up to eight pumps or more may be provided with the secondary pump system 19.

As known to one of ordinary skill in the art, the chilled water system 11 may provide fluid communication or fluid connections between the various components with interconnecting piping, as illustrated at FIG. 1. It is foreseen that piping, valves, and fittings may be used to implement the fluid communication or fluid connections according to embodiments of the invention.

As explained in more detail below, the chiller system 13 may further comprise a modular chiller plant 21 and a heat rejection system 23.

The chilled water system 11 may be configured to provide heat transfer between a working fluid (e.g., water) and a process fluid (e.g., air) at the heat exchanger 15. The heat exchanger 15 may be, for example, a coil 31 which provides for heat transfer between the working fluid and the process fluid. As known by one of ordinary skill in the art, the coil 31 may transfer heat, or "load," between the working fluid and the process fluid. This load may be referred to as cooling coil load, which is the required cooling needed to achieve a desired heat transfer or process fluid temperature. For example, heat transfer provided by the heat exchanger 15 may cool or chill the process fluid using the working fluid. According to an embodiment, variations of cooling coil load may be addressed by modulating chilled water flow to the coil 31 using a modulating or control valve at the coil 31 inlet. According to an embodiment, the coil 31 may have a piping bypass to divert flow around the coil 31, wherein the diverted flow may be modulated by a control valve. For example, when the cooling coil load decreases, working fluid may be diverted around the coil 31 using the piping bypass.

In an embodiment, the process fluid may be, for example, air, natural gas, water, or other fluid, gas, or liquid depending on the application. In a turbine inlet air cooling embodiment, for example, the process fluid may be air or ambient air and the coil 31 may be provided in a combustion turbine filter house as an air coil.

In a liquefied natural gas (LNG) embodiment, for example, the process fluid may be natural gas and the coil may be provided at a compressor inlet for liquefying the natural gas.

In a district cooling embodiment, for example, the process fluid may be air or ambient air and the coil may be provided at an energy transfer station.

According to other embodiments, for example, the coil 31 may be provided at an industrial, residential, or commercial location to provide heat transfer with a load.

In general, the chilled water or working fluid may experience heat gain and become hot water as a result of heat transfer at the coil 31. The hot water may circulate to the modular chiller plant 21. For example, the modular chiller plant 21 is capable of removing heat from the hot water so that chilled water may be recirculated back to the coil 31. In turn, the modular chiller plant 21 may reject heat to the heat rejection system 23.

The heat rejection system 23 may be any type of heat rejection system which may be selected based on the ambient conditions. The heat rejection system may be, for example, a cooling tower, a radiator, a wet cooling tower to reject heat from circulating cooling water directly to the atmosphere, a dry cooler to reject heat from circulating cooling water indirectly to the atmosphere, a hybrid dry/wet cooler to reject heat from circulating cooling flowing through tubing and using water sprayed over tubing, or other heat rejection system as known to one of ordinary skill in the art.

In an exemplary turbine inlet air cooling embodiment, such as shown in FIG. 1, the chiller system 13 may provide circulating chilled water via a chilling circuit 41 directly to the coil 31, such as a turbine inlet air cooling coil, where heat may be transferred from air passing over the coil 31 to the circulating chilled water. According to an embodiment, the circulating chilled water may be provided via the chilling circuit 41 directly to the coil 31 such as through interconnecting piping, valves, fittings, and/or pumps. According to an embodiment, the circulating chilled water may be provided via the chilling circuit 41 directly to the coil 31 without passing through the thermal energy storage tank 17. With heat transfer at the coil 31, the circulating chilled water may gain heat and become hot water while the air is cooled. The cooled turbine inlet air may then enter the gas turbine. Circulating water leaving the air coil 31 as hot water may then flow or circulate to the inlet of the chiller system 13 where the water may be chilled and recirculated to the coil 31.

With the optional thermal energy storage tank 17, the chilled water system may operate in a variety of different operating modes. For example, the chiller system 13 may provide chilled water to charge the thermal energy storage tank 17 with chilled water. According to an embodiment, chilled water provided to the coil 31 may be provided indirectly from the chiller system 13 via the thermal energy storage tank 17. For example, the secondary pump system 19 may pump chilled water from the thermal energy storage tank 17 to the coil 31. According to an embodiment, chilled water provided to the coil 31 may be provided exclusively from the thermal energy storage tank 17, or partially from the thermal energy storage tank and partially directly from the chiller system 13. It is foreseen that other operating modes may be used with the chilled water system in order to shift refrigeration loads provided by water directly from the chiller system 13 or indirectly via the thermal energy storage tank 17, partially or fully, to different times of the day, night, week, month, season, or other time frame.

As illustrated at FIG. 1, the chiller system 13 may further comprise the modular chiller plant 21 and the heat rejection system 23. Referring now to FIGS. 2-7, the modular chiller plant 21 may comprise at least one or a plurality of chiller modules 51, at least one first pump module or chilling water pump module 53, and at least one second pump module or cooling water pump module 55. At least one power module 57 may be optionally provided. It is foreseen that the modular chiller plant 21 may have any number or a plurality of chiller modules 51, first pump modules 53, second pump modules 55, and optional power modules 57. The plurality of chiller modules 51, first pump module 53, second pump module 55, and optional power module 57 may collectively form a common and contiguous machine room 61. For example, the common and contiguous machine room 61 may have no walls separating equipment of the chiller modules 51, first pump module 53, and second pump module 55.

According to an embodiment, walls 65 may be provided at only a perimeter of the common and contiguous machine room 61. According to an embodiment, no walls are provided between equipment within the common and contiguous machine room 61. For example, no walls are provided within the perimeter of the machine room 61 in order to provide an obstruction-free area around equipment within the machine room, such as the chiller and pumps, and provide unobstructed access to ingress/egress locations 67 (see FIG. 7) provided within the walls 65.

Figure 2:
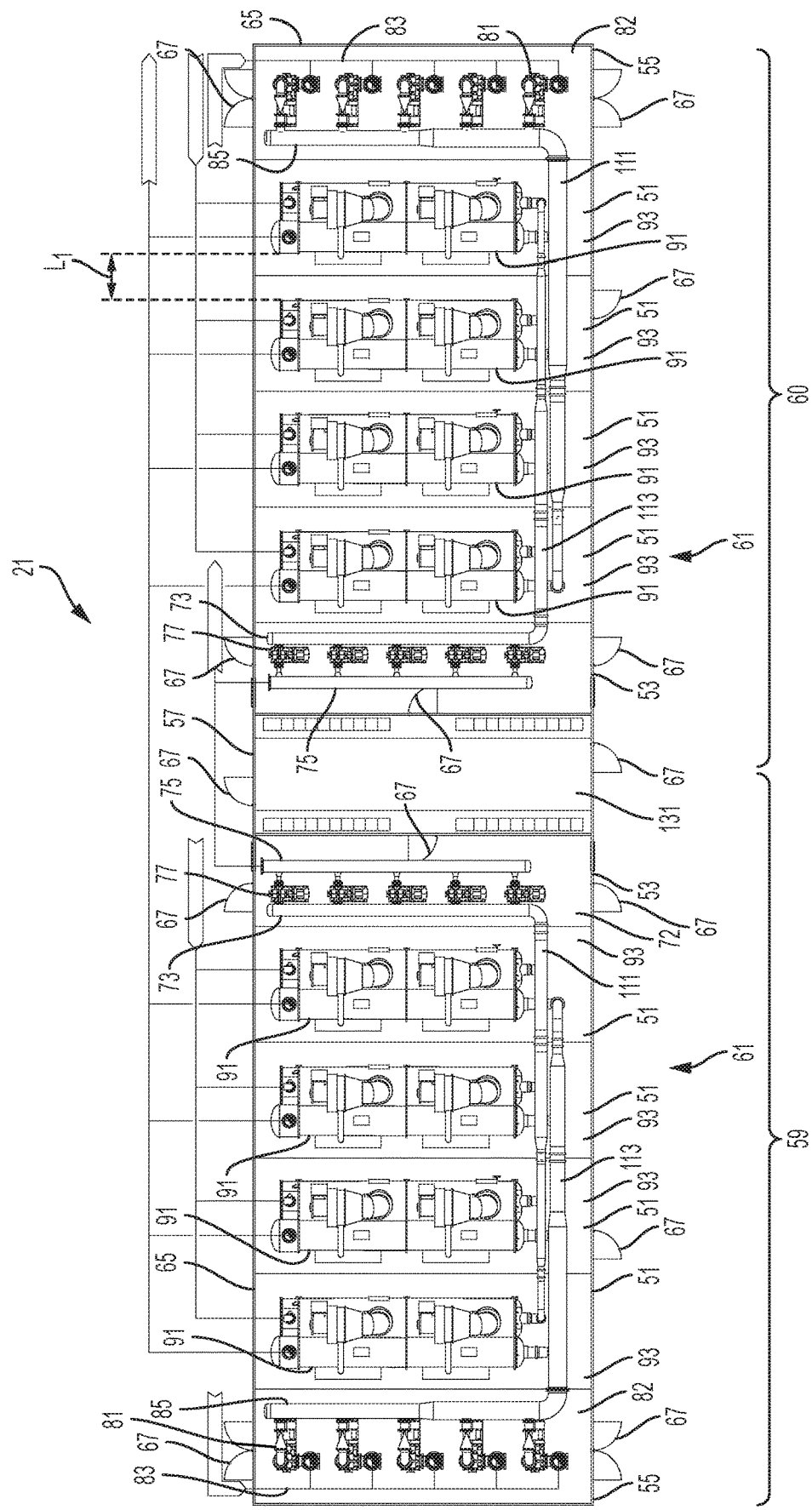
FIG. 2 is a top plan view of a chiller plant according to an embodiment.
Figure 3:
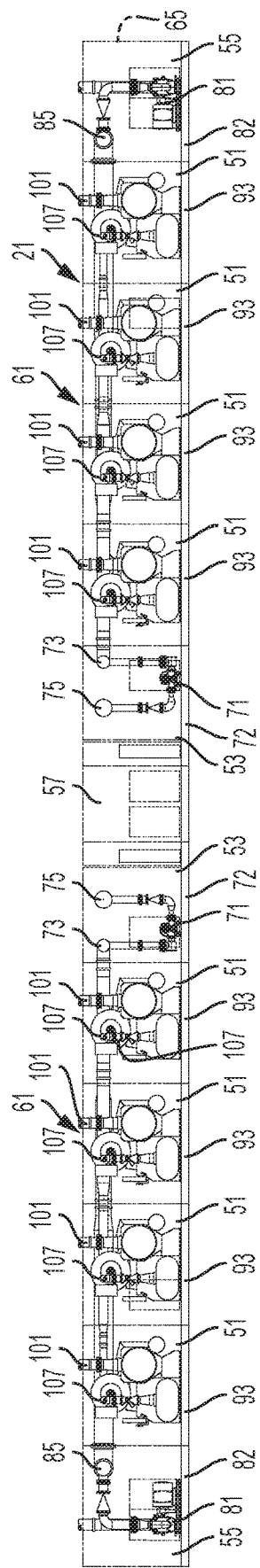
FIG. 3 is rear view of the chiller plant of FIG. 2.
Figure 4:
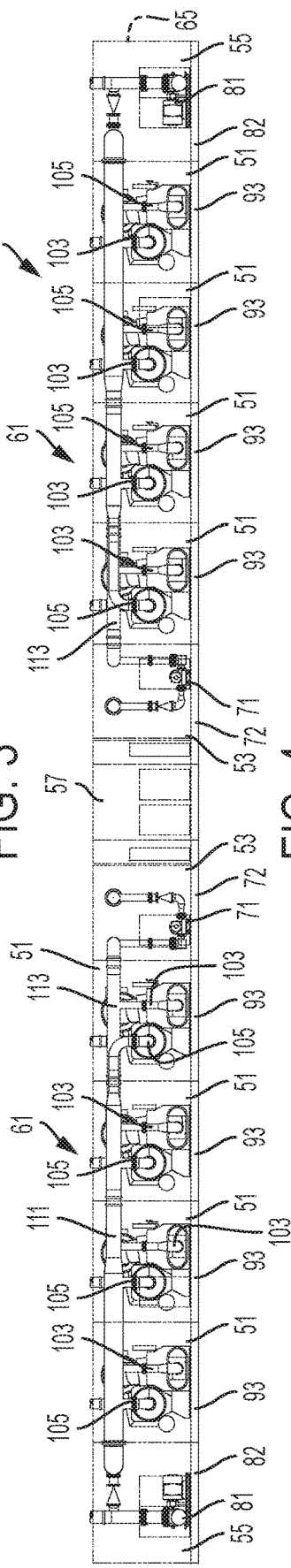
FIG. 4 is a front view of the chiller plant of FIG. 2.
Figure 6:
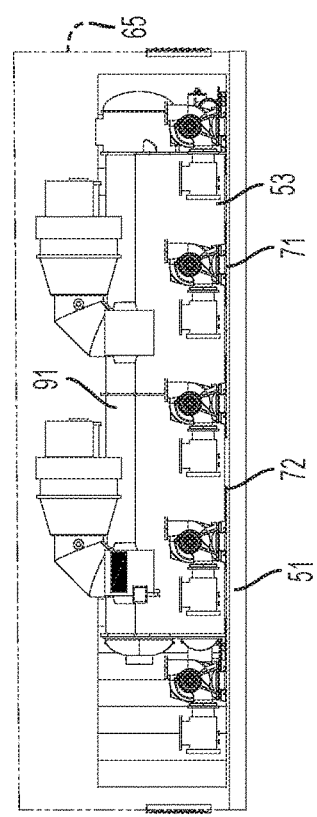
FIG. 6 is a right-side view of the chiller plant of FIG. 2.
Figure 5:
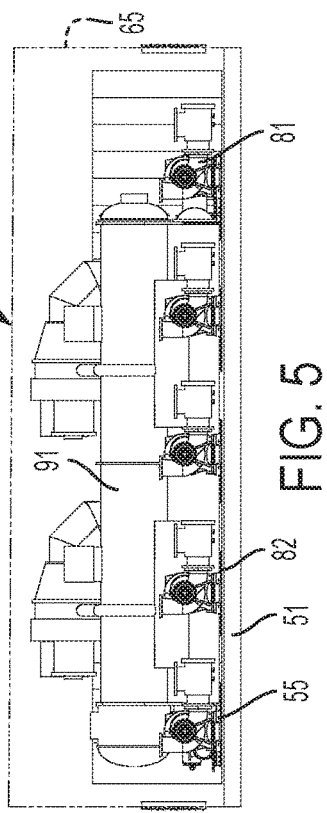
FIG. 5 is a left-side view of the chiller plant of FIG. 2.

According to an embodiment as illustrated at FIG. 2, for example, the modular chiller plant 21 may include identical functional chiller system component 59 and 60. For example, each functional chiller system component 59, 60 may operate as a standalone chiller plant or together. According to an embodiment, each functional chiller system components 59 and 60 has a respective common and contiguous machine room 61. According to another embodiment (not depicted), the functional chiller system components 59 and 60 may share a single common and contiguous machine room 61. In the illustrated embodiment at FIG. 2, the functional chiller system components 59 and 60 are each half of the modular chiller plant 21. Depending on the chilled water requirements of the chilled water system 11 and/or the coil 31, only one of either functional chiller system components 59 or 60 may be operated to provide chilled water to the chilled water system 11. For example, the other of the functional chiller system components 59 or 60 may be used as a spare or redundant functional chiller system component. According to an embodiment, the functional chiller system components 59 and 60 may be used alternately to provide chilled water in order to increase the lifespan of the modular chiller plant 21. According to another embodiment, both functional chiller system components 59 and 60 may be used simultaneously to provide chilled water. Although two functional chiller system components are illustrated, it is foreseen that only one functional chiller system component or more than two functional system components may be provided with the modular chiller plant 21. For example, third and fourth functional chiller system components or more may be easily provided for additional chilled water production to meet the load at the coil 31.

Referring now to the first pump module 53 illustrated at FIGS. 2, 3, 4, 7, and 8, the first pump module 53 may be a primary pumping system and have at least one or a plurality of chilling water pumps 71, such as up to eight chilling water pumps 71 or more, on one skid or platform 72 for circulating chilled water to the chilling circuit 41, such as to the coil 31 and/or the optional thermal energy storage tank 17. According to the illustrated embodiment, the first pump module 53 may include five chilling water pumps 71 on the one skid or platform 72. However, it is foreseen that any number of chilling water pumps 71 may be arranged on the one skid or platform 72. According to an embodiment, the plurality of chilling water pumps 71 may be arranged in parallel and/or piped in parallel on the one skid or platform 72. Additionally, the plurality of chilling water pumps 71 may have a common chilled water pump inlet header 73 and a common chilled water pump outlet header 75 on the one skid or platform 72.

According to an embodiment as illustrated at FIG. 2, the common chilled water pump inlet header 73 may comprise a pipe of constant diameter. Similarly, the common chilled water pump outlet header 75 may comprise a pipe of constant diameter. However, as described below with respect to the cooling water pump module 55, the common chilled water pump inlet header 73 and/or the common chilled water pump outlet header 75 may comprise a pipe of varying diameter. For example, the pipe diameter may step down to a reduced diameter in the direction of water flow. Alternatively, the pipe diameter may step up to an increased diameter in the direction of water flow.

Figure 8:
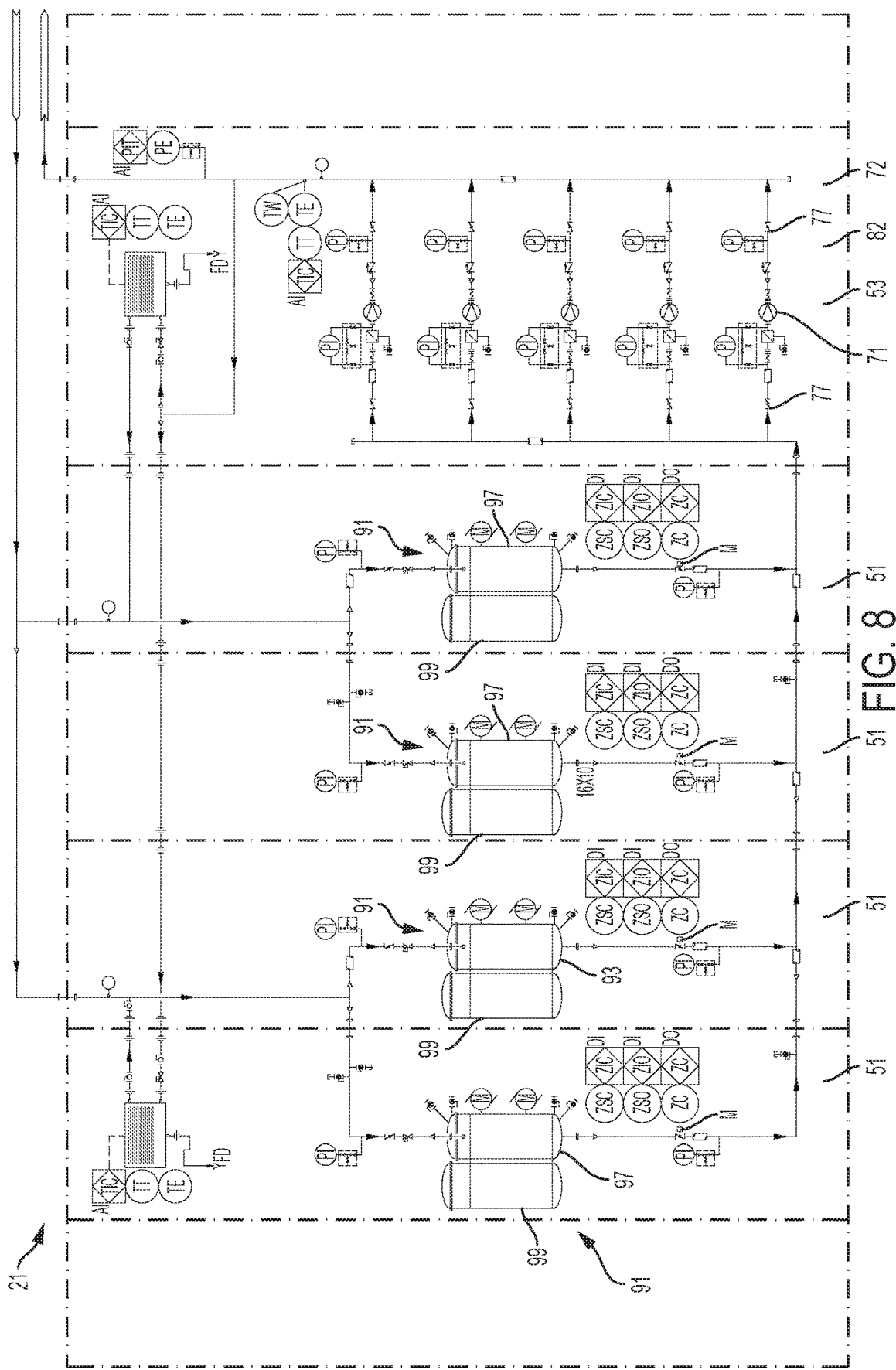
FIG. 8 is flow schematic of an embodiment of a chilled water loop.

According to an embodiment, as illustrated at FIG. 8, each of the chilling water pumps 71 may be provided with isolation valves 77 at the common chilled water pump inlet header 73 and the common chilled water pump outlet header 75 so that each chilling water pump 71 may be selectively isolated, for example, when maintenance is needed or when demand for the chilling water decreases.

According to an embodiment, it is foreseen that the chilling water pumps 71 may be provided on multiple skids or platforms 72, such that the chilling water pumps 71 on the multiple skids or platforms may share a common chilled water pump inlet header and a common chilled water pump outlet header.

As with the secondary pump system 19, according to an embodiment, the one or more pumps of the first pump module 53 may be any pump suitable for pumping fluid such as, for example, but not limited to, a centrifugal pump, a vertical inline or end suction pump, or a vertical turbine pump. According to an embodiment, the pumps may be constant speed pumps or may operate at a constant speed. According to another embodiment, the pumps may be variable speed pumps or may operate at variable speeds. According to an embodiment, the pumps may comprise a PACO® pump, an Armstrong® pump, or other device capable of conveying liquid or fluid. According to an embodiment where more than one pump is provided, the pumps may be arranged in parallel.

According to an embodiment, the first pump modules 53 may be identical. For example, the size and equipment layout of each first pump module 53 may be identical, which allows for ease of manufacturing and fabrication, as well as interchangeability.

Referring now to the second pump module 55, illustrated at FIGS. 2-7 and 9, the second pump module 55 may be a cooling water pumping system and have at least one or a plurality of cooling water pumps 81, such as up to eight cooling water pumps 81 or more, on one skid or platform 82 for circulating cooling water to the heat rejection system 23. According to the illustrated embodiment, the second pump module 55 may include five cooling water pumps 81 on the one skid or platform 82. However, it is foreseen that any number of cooling water pumps 81 may be arranged on the one skid or platform 82. According to an embodiment, the plurality of cooling water pumps 81 may be arranged in parallel and piped in parallel on the one skid or platform 82. Additionally, the plurality of cooling water pumps 81 may have a common cooling water pump inlet header 83 and a common cooling water pump outlet header 85 on the one skid or platform 82.

According to an embodiment as illustrated at FIG. 2, the common cooling water pump inlet header 83 and/or the common cooling water pump outlet header 85 may comprise a pipe of varying diameter. According to an embodiment, the pipe diameter may step up to an increased diameter in the direction of water flow. Alternatively, the pipe diameter may step down to a decreased diameter in the direction of water flow. However, as described above with respect to the chilling water pump module 53, the common cooling water pump inlet header 83 and/or the common cooling water pump outlet header 85 may comprise a pipe of constant diameter.

Figure 9:
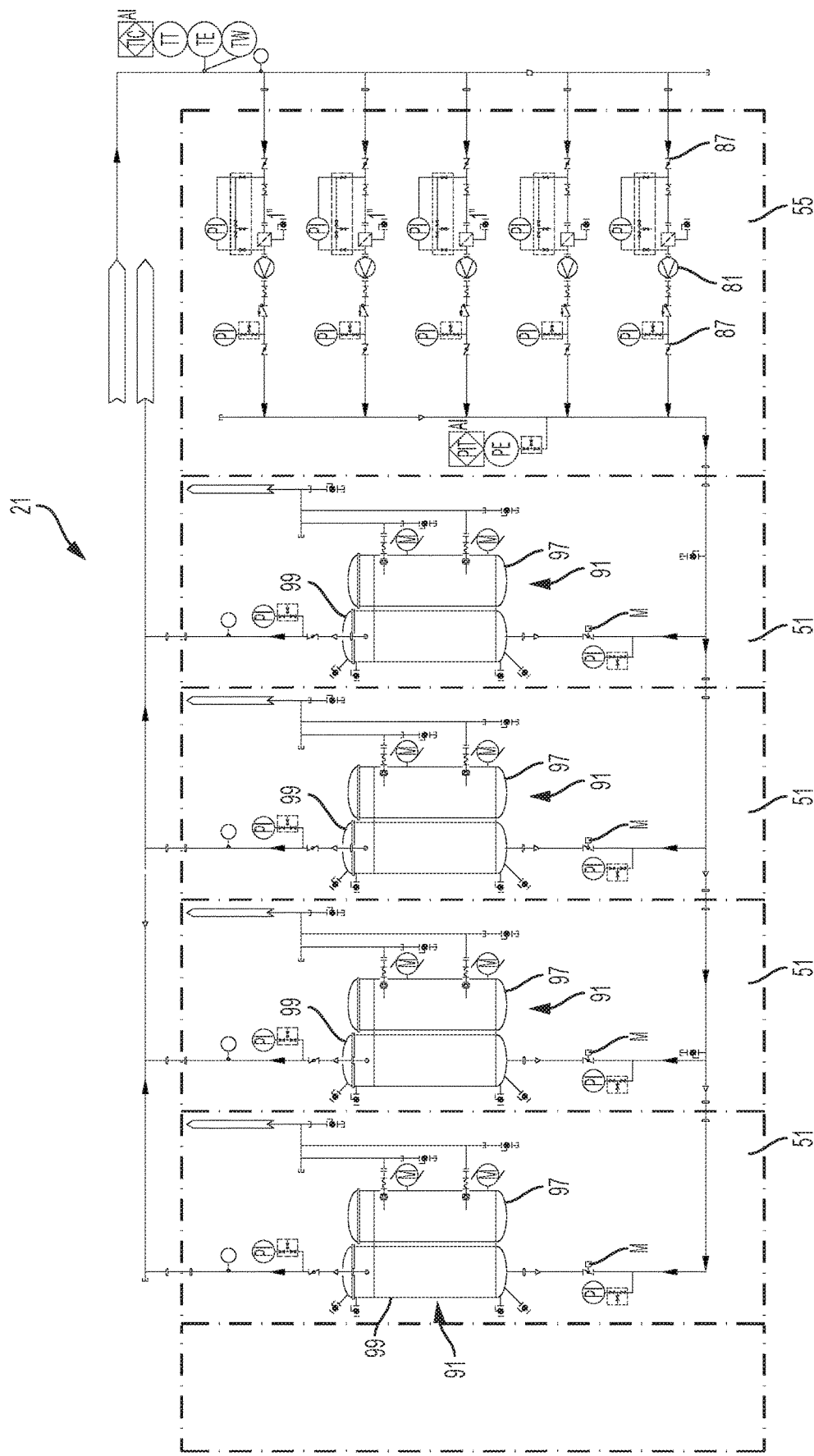
FIG. 9 is a flow schematic of an embodiment of a cooling water loop.

According to an embodiment, as illustrated at FIG. 9, each of the cooling water pumps 81 may be provided with isolation valves 87 at the common cooling water pump inlet header 83 and the common cooling water pump outlet header 85 so that each cooling water pump 81 may be selectively isolated, for example, when maintenance is needed or when demand for the cooling water decreases.

According to an embodiment, it is foreseen that the cooling water pumps 81 may be arranged on multiple skids 82, such that the cooling water pumps 81 on the multiple skids may share a common cooling water pump inlet header and a common cooling water pump outlet header.

As with the secondary pump system 19, according to an embodiment, the one or more pumps of the second pump module 55 may be any pump suitable for pumping fluid such as, for example, but not limited to, a centrifugal pump, a vertical inline or end suction pump, or a vertical turbine pump. According to an embodiment, the pumps may be constant speed pumps or may operate at a constant speed. According to another embodiment, the pumps may be variable speed pumps or may operate at variable speeds. According to an embodiment, the pumps may comprise a PACO® pump, an Armstrong® pump, or other device capable of conveying liquid or fluid. According to an embodiment where more than one pump is provided, the pumps may be arranged in parallel.

According to an embodiment, the second pump modules 55 may be identical. For example, the size and equipment layout of each second pump module 55 may be identical, which allows for ease of manufacturing and fabrication, as well as interchangeability.

It is foreseen that the location of the first pump module 53 may be interchangeable with the location of the second pump module 55 by appropriately modifying the header configurations for the respective fluid connections.

Referring now to the chiller module 51, illustrated at FIGS. 2-9, each chiller module 51 may be provided with at least one chiller 91 mounted on a single chiller skid or platform 93. As illustrated at FIGS. 8 and 9, for example, each water chiller 91 may comprise an evaporator 97 and a condenser 99. The evaporator 97 may be provided with an evaporator inlet 101 and an evaporator outlet 103. According to an embodiment, the evaporator inlet 101 and the evaporator outlet 103 may extend outwardly and/or upwardly from the evaporator 97 of the water chiller 91. Similarly, according to an embodiment, the condenser inlet 105 and the condenser outlet 107 may extend outwardly and/or upwardly from the condenser 99 of the water chiller 91. For example, the evaporator inlet and outlet 101, 103 and the condenser inlet and outlet 105, 107 provide convenient locations to connect common headers or to each other, as described in more detail below. The headers may be provided with valves to selectively isolate each water chiller 91. For example, one or more of the water chillers 91 may be isolated for maintenance or when the load or need for chilling water decreases.

As known to one of ordinary skill in the art, a chiller is machine that removes heat from the working fluid, e.g. water, to, for example, produce chilled water. If is foreseen that the water chiller 91 may be a mechanical chiller, an absorption chiller, a centrifugal chiller, a chiller utilizing vapor compression or absorption refrigeration cycles, or other device capable of chilling water. According to an embodiment, the chiller 91 may be a conventional or commercial chiller such as, for example, a Duplex® chiller provided by the Trane Company, a simplex chiller, a duplex-type chiller, or another chiller known to those of ordinary skill in the art. For example, the Duplex® chiller may have constant speed compressors but it is foreseen that other types of compressors and configurations may be used. According to an embodiment, each water chiller 91 may have a refrigeration capacity of approximately 1,500 to 4,000 tons. For example, each chiller 91 may have an identical refrigeration capacity. According to an embodiment when the chillers 91 are arranged in parallel, the identical refrigeration capacity may allow for increased system control, due to smaller and equivalent capacity steps with operating each chiller 91.

According to an embodiment, each chiller module 51 may be provided with a controller or programmable logic controller (PLC), such as a chiller module control panel (CMCP). For example, the controller or PLC may be located on the chiller module 51, on the power module 57, or at a remote location. According to an embodiment, the controller may control system operation such as, for example: automatically starting and stopping the chiller module 51 based on current ambient conditions; automatically restarting the chiller module 51 in the event of electricity loss, power failure or plant shutdown; interfacing with flow transmitters to provide pump proof-of-flow; controlling the chiller 91, such as by starting the chiller, stopping the chiller, and/or resetting a chiller set point, in response to a local or remotely supplied chilled water set point; and monitoring the chiller 91 via a communication link and/or distributing operating information about the chiller 91. For example, the chiller set point may be a leaving chilled water supply temperature, a chiller start time delay, and/or a chiller stop time delay. It is foreseen that other types of controls may be used with the controller.

According to an embodiment, the chiller modules 51 are identical. For example, the size and equipment layout of each chiller module 51 is identical, which allows for ease of manufacturing and fabrication, as well as interchangeability.

According to an embodiment, the plurality of chiller modules 51 of each functional chiller system component may be provided adjacent to each other so that the chillers 91 may be arranged and piped in parallel with each other. For example, the chillers 91 may receive water from a common inlet and produce chilled water to a common output. For example, referring to FIGS. 2, 3, 4, and 7, the plurality of chiller modules 51 provided with each functional chiller system component may include a common chilled water evaporator outlet header 111 and a common cooling water condenser inlet header 113.

According to an embodiment, it is foreseen that two or more chillers may be piped in series such that water is conveyed through a first chiller and then through a second chiller 91. For example, the chillers may be physically arranged in parallel but piped in series.

The common chilled water evaporator outlet header 111 may be connected to the evaporator outlets 103 of each chiller module 51 such that the evaporators 97 are piped in parallel with each other. The common cooling water condenser inlet header 113 may be connected to the condenser inlets 105 of each chiller module 51 such that the condensers 99 are piped in parallel with each other.

The common chilled water evaporator outlet header 111 may be fluidly connected to the common chilled water pump return header 73 so that one or more of the chilling water pumps can circulate water through the chiller evaporator 97 and the chilling circuit 41. The common cooling water condenser inlet header 113 may be fluidly connected to the common cooling water pump outlet header 85 so that one or more of the cooling water pumps can circulate water to the heat rejection system 23.

According to an embodiment as illustrated at FIG. 2, the common chilled water evaporator outlet header 111 and/or the common cooling water condenser inlet header 113 may comprise a pipe of varying diameter. According to an embodiment, the pipe diameter may step up to an increased diameter in the direction of water flow. Alternatively, the pipe diameter may step down to a decreased diameter in the direction of water flow. According to another embodiment, the common chilled water evaporator outlet header 111 and/or the common cooling water condenser inlet header 113 may comprise a pipe of constant diameter.

According to an embodiment where the chillers 91 are piped in parallel, as compared with an embodiment where the chillers 91 are piped in series, the common chilled water evaporator outlet header 111 and/or the common cooling water condenser inlet header 113 may have a smaller pipe diameter and up to 50% lower cooling water velocities. The lower water velocities may minimize pipe or tubing erosion in the chillers 91 and maximize the chiller life.

According to an embodiment, the optional power module 57 may be provided on a skid or platform 131 at the end of the functional chiller system component 59 or between two functional chiller system components 59, 60. The optional power module 57 may provide a central location for controller displays such as from the controller or PLC from each chiller module 51.

According to an embodiment, a master controller or PLC may be provided to control the chiller modules 51, first pump module 53, and second pump module 55. For example, the master controller or PLC may be located on one of the chiller modules 51, on the power module 57, or at a remote location. According to an embodiment, the master controller or PLC may control system operation such as, for example: automatically starting and stopping the chiller modules 51 based on current ambient conditions; automatically restarting the chiller modules 51 in the event of electricity loss, power failure or plant shutdown; interfacing with flow transmitters to provide pump proof-of-flow; controlling the chillers 91, such as by starting the chiller, stopping the chiller, and/or resetting a chiller set point, in response to a local or remotely supplied chilled water set point; and monitoring the chillers 91 via a communication link and/or distributing operating information about the chillers 91; and sequencing or alternating operation of the chillers 91, chilling water pumps 71, and cooling water pumps 81. For example, the master controller or PLC may determine an optimal number of chillers 91 and pumps 71, 81 to operate to meet a particular chilled water requirement or load. It is foreseen that other types of controls may be used with the master controller or PLC.

According to an embodiment the master controller or PLC may sense a required cooling coil load, determine an amount and/or temperature of chilled water to meet the required cooling coil load, determine a number of chillers and pumps or chiller modules and pump modules needed to produce the determined amount and/or temperature of chilled water, and then select one or more chillers and pumps or chiller modules and pump modules to produce the determined amount and/or temperature of chilled water. The master controller or PLC may then start the selected one or more chillers and pumps or chiller modules and pump modules. The master controller or PLC may also stop any non-selected chillers and pumps or chiller modules and pump modules. According to an embodiment, the master controller or PLC may select the chillers and pumps or chiller modules and pump modules from one, two, or any number of functional chiller system components, such as from functional chiller system components 59, 60.

According to an embodiment, the optional power module 57 may provide a central access point for power to operate electronic components of the chiller modules 51, first pump modules 53, and second pump modules 55, as well as to operate lights and other electronic equipment throughout the common and contiguous machine room 61 and chiller system 13. For example, according to an embodiment, the master controller or PLC may be located at the optional power module 57.

Figure 7:
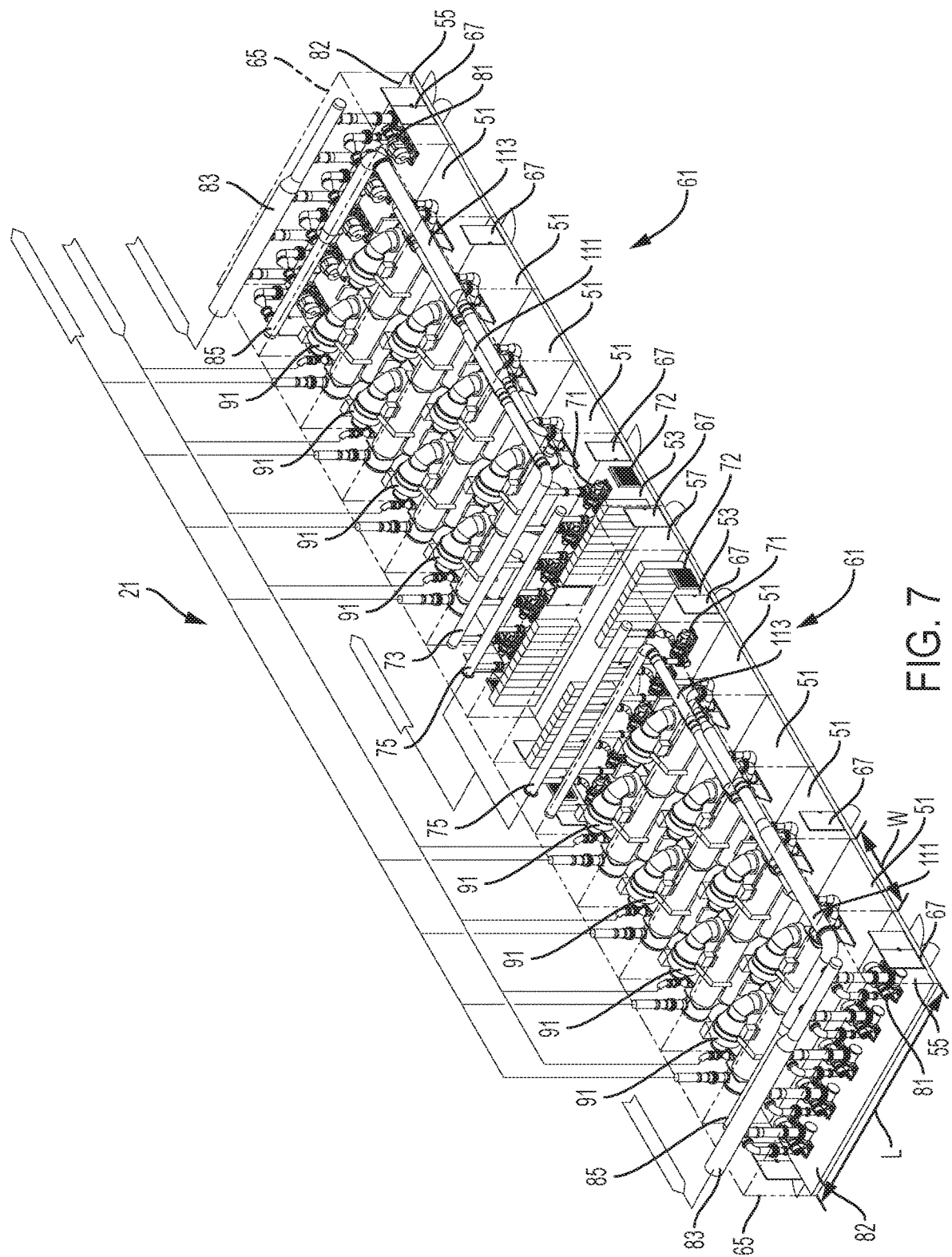
FIG. 7 is a perspective view of the chiller plant of FIG. 2.

Referring now to FIGS. 2 and 7, the skids or platforms 72, 82, 93, 131 may collectively define the entire perimeter of the common and contiguous machine room 61. Additionally, the skids or platforms 72, 82, 93, 131 may collectively define the floor of the common and contiguous machine room 61. Additionally, the skids or platforms 72, 82, 93, 131 may collectively define the walls of the common and contiguous machine room 61. Additionally, the skids or platforms 72, 82, 93, 131 may collectively define the ceiling of the common and contiguous machine room 61. According to an embodiment, the walls and ceiling may be provided separate from and mounted on the skids or platforms 72, 82, 93, 131.

According to an embodiment, the skids or platforms 72, 82, 93, 131 may have a steel base having a structural steel perimeter with intermediate structural steel members sized to meet or exceed design loads. The structural steel members may be located to facilitate mounting of equipment such as chillers and/or pumps. It is foreseen that the skids or platforms 72, 82, 93, 131 may be constructed of other materials known to those of ordinary skill in the art capable of supporting the load of chillers, pumps, and other equipment. Additionally, the skids or platforms 72, 82, 93, 131 may have lifting trunnions so that the modules can be lifted and arranged for installation, replacement, and/or removal.

According to an embodiment, the length L of each skid or platform 72, 82, 93, 131 may be the same. For example, as illustrated at FIG. 2, the perimeter of the common and contiguous machine room 61 may be a rectangular shape with each skid or platform 72, 82, 93, 131 having the same length L. According to an embodiment, the width W of each skid or platform 72, 82, 93, 131 may be the same. According to an embodiment, the length L of each skid or platform 72, 82, 93, 131 may be in the range of approximately 45 to 50 feet. According to an embodiment, the width W of each skid or platform 72, 82, 93, 131 may be in the range of approximately 14 to 16 feet.

The width W of each skid or platform 72, 82, 93, 131 may be predetermined based on a desired or required distance, or clearance, between equipment. For example, referring now to FIG. 2, a clearance $C_1$ may be desired between the chillers 91 of adjacent chiller modules 51 and may be determined prior to installation of the respective modules so that the width W of the chiller skid or platform 93 may be sized appropriately considering the placement of the chillers 91 on the chiller skids or platforms 93. The skids or platforms 72, 82, 93, 131 may be sized for transport via roadways or cargo ship.

According to an embodiment as illustrated at FIGS. 3-7, the optional power module skid or platform 131 may be provided with a wall 65 along the front and rear ends thereof, as well as both sides of the power module skid or platform 131. According to an alternative embodiment, the optional power module skid or platform 131 may be provided with a wall 65 along the front and rear ends thereof. According to this alternative embodiment, the walls 65 are provided at only the front and rear ends of the power module skid or platform 131. According to this alternative embodiment, no other walls are provided with the power module skid or platform 131. According to another embodiment, it is foreseen that any of two, three, or four walls 65 may be provided along the front end, rear end, and one or two sides of the power module skid or platform 131, depending on a desired configuration of the common and contiguous machine room 61 for one functional chiller system component or two functional chiller system components. According to an embodiment, an ingress/egress location 67, such as a doorway or a window, may be provided through any number or all of the walls 65 provided with the power module skid or platform 131. According to an embodiment, the power module skid or platform 131 may be provided with a ceiling.

According to an embodiment as illustrated at FIGS. 3-7, each chiller skid or platform 93 may be provided with a wall 65 along the front and rear ends thereof. According to an embodiment, the walls 65 are provided at only the front and rear ends of each chiller skid or platform 93. According to an embodiment, no other walls are provided with each chiller skid or platform 93. According to an embodiment, an ingress/egress location 67, such as a doorway or a window, may be provided through any one or both of the walls 65 provided with each chiller skid or platform 93. According to an embodiment, each chiller skid or platform 93 may be provided with a ceiling.

According to an embodiment as illustrated at FIGS. 3-7, each chilling water pump skid or platform 72 may be provided with a wall 65 along the front and rear ends thereof. According to an embodiment, the walls 65 are provided at only the front and rear ends of each chiller skid or platform 72. According to an embodiment, no other walls are provided with each chiller skid or platform 72. According to an embodiment, an ingress/egress location 67, such as a doorway or a window, may be provided through any one or both of the walls 65 provided with each chilling water pump skid or platform 72. However, as explained above, the chilling water pump module 53 may be interchangeable with the cooling water pump module 55. Accordingly, the chilling water pump module 53 can be provided with the walls 65 as explained below with respect to the cooling water pump skid or platform 82. According to an embodiment, each cooling water pump skid or platform 82 may be provided with a ceiling.

According to an embodiment as illustrated at FIGS. 3-7, each cooling water pump skid or platform 82 may be provided with a wall 65 along the front and rear ends thereof, as well as along one side of each cooling water pump skid or platform 82. According to an embodiment, the walls 65 are provided at only the front and rear ends and one side of each chiller skid or platform 82. According to an embodiment, no other walls are provided with each chiller skid or platform 82. According to an embodiment, an ingress/egress location 67, such as a doorway or a window, may be provided through any one, two, or all of the walls 65 provided with each cooling water pump skid or platform 82. However, as explained above, the cooling water pump module 55 may be interchangeable with the chilling water pump module 53. Accordingly, the cooling water pump module 55 can be provided with the walls 65 as explained below with respect to the chilling water pump skid or platform 72. According to an embodiment, each chilling water pump skid or platform 72 may be provided with a ceiling.

With the chiller modules 51, chilling water pump modules 53, cooling water pump modules 55, and power module 57, the modular chiller plant 21 may be assembled having the common and contiguous machine room 61. According to an embodiment, one functional chiller system component 59 may be assembled by placing a plurality of chiller modules 51 in direct contact with each other such that the sides of adjacent chiller skids 93 are in direct contact with or touching each other. The cooling water pump module 55 may be placed in direct contact with the chiller module 51 at one end of the plurality of chiller modules 51 such that the side having no wall 65 of the cooling water pump skid or platform 82 is in direct contact with the side of the end chiller skid or platform 93. The chilling water pump module 53 may be placed in direct contact with the chiller module 51 at the other end of the plurality of chiller modules 51 such that a side of the chilling water pump skid or platform 72 is in direct contact with the side of the other end chiller skid or platform 93. Optionally, the power module 57 may be placed in direct contact with the side of the chilling water pump module 53 which is not in direct contact with the chiller module 51, such that a side of the power module skid or platform 131 is in direct contact with that side of the chilling water pump skid or platform 72. The skids or platforms described above which are in direct contact with each other may be affixed or attached together to provide a fixed surface or floor. For example, the skids or platforms may be affixed together by welding, bolts, fasteners, or other attachment mechanisms known to those of ordinary skill in the art.

As described above, the assembled chiller modules 51, chilling water pump module 53, cooling water pump module 55, and optional power module 57 form the common and contiguous machine room 61 for the functional chiller system component 59 having a wall 65 surrounding the perimeter thereof. According to an embodiment, the common and contiguous machine room 61 of the functional chiller system component 59 includes no walls between the pumps and chillers. For example, the assembled chiller modules 51, chilling water pump module 53, cooling water pump module 55, and optional power module 57 can be provided side-by-side so that the respective walls collectively form a wall around the perimeter thereof.

The functional chiller system component 59 may be further assembled with interconnecting piping, fittings, valves, instrumentation, common headers and/or other components to fluidly connect the functional chiller system component 59 with the chilling circuit 41. According to an embodiment, the physical arrangement of the chiller modules 51, chilling water pump module 53, cooling water pump module 55, and optional power module 57 may provide for flexibility in piping configuration where chillers 91 may be piped in series or in parallel with each other while minimizing the spatial requirements and maximizing clearances in the functional chiller system component 59 for operations and maintenance personnel.

Similar to the assembly of the functional chiller system component 59, the functional chiller system component 60 may be assembled to the other side of the optional power module 57 or directly to the side of the chilling water pump module 53. According to an embodiment, the assembled chiller modules 51, chilling water pump module 53, cooling water pump module 55, and optional power module 57 form the common and contiguous machine room 61 for the functional chiller system component 60 having a wall 65 surrounding the perimeter thereof. According to an alternative embodiment, the power module 57 may contain no walls 65 at the sides thereof such that after assembly of the functional chiller system components 59 and 60, the functional chiller system component 59 and 60 form a single common and contiguous machine room 61 of a modular chiller plant 21.

According to an embodiment, as the modular chiller plant 21 is assembled or installed, as described above, the modular chiller plant 21 may be connected to the chilling circuit 41 and electrical connections provided at the site.

According to an embodiment, the modular chiller plant 21 may be a self-contained chilled water production system. For example, the modular chiller plant 21 may be an alternative to a conventional chiller plant built on-site, conventionally known in the art as a stick-built plant. The modular chiller plant 21 may be pre-engineered and fabricated with all system components. For example the modular chiller plant 21 may be pre-piped, wired, tested, and the modules may be shipped to an installation site where only water and power connections exist. As described above, the modular chiller plant 21 may be quickly assembled without the need for onsite engineering and fabrication.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that, within the scope of the claims and their equivalents, the invention may be practiced otherwise than as specifically described.

We claim:

1. A chiller plant comprising:
   a first pump module having a first pump module platform, a plurality of first pump module pumps, and at least one first pump module wall;
   a second pump module having a second pump module platform, a plurality of second pump module pumps, and at least one second pump module wall; and
   a plurality of chiller modules each having a chiller module platform and at least one chiller module wall, the plurality of chiller modules arranged and piped in parallel,
   wherein the plurality of first pump module pumps have a common first pump module inlet header and a common first pump module outlet header, the plurality of second pump module pumps have a common second pump module inlet header and a common second pump module outlet header,
   wherein the plurality of chiller modules are configured to be fluidly connected in parallel via a common chilled water evaporator outlet header to the first pump module and fluidly connected in parallel via a common cooling water condenser inlet header to the second pump module,
   wherein the first pump module platform, the second pump module platform, and the chiller module platform are separate,
   wherein the first pump module, the second pump module, and the plurality of chiller modules are placed together to form the chiller plant, and
   wherein the at least one first pump module wall, the at least one second pump module wall, and the chiller module walls collectively form a perimeter wall around at least a portion of the chiller plant.

2. The chiller plant of claim 1, wherein the at least one first pump module wall, the at least one second pump module wall, and the chiller module walls collectively form a perimeter wall around the entire chiller plant.

3. The chiller plant of claim 1, wherein the first pump module platform, the second pump module platform, and the chiller module platform collectively form a floor of the chiller plant.

4. The chiller plant of claim 3, wherein the first pump module platform, the second pump module platform, and the chiller module platform have the same length.

5. The chiller plant of claim 1, wherein the chiller plant does not include any walls between the plurality of chiller modules.

6. The chiller plant of claim 1, wherein each of the plurality of chiller modules further comprises at least one chiller having an evaporator and a condenser,
   wherein the first pump module is fluidly connected to each evaporator and is adapted to convey chilled water through each evaporator, and the second pump module is fluidly connected to each condenser and is adapted to convey cooling water through each condenser.

7. The chiller plant of claim 1, wherein the chiller plant is comprised of a first functional chiller system component and a second functional chiller system component;
   the first functional chiller system component having at least one first pump module having a first pump module platform, a plurality of first pump module pumps, and at least one wall, at least one second pump module having a second pump module platform, a plurality of second pump module pumps, and at least one second pump module wall; and at least one plurality of chiller modules each chiller module having a chiller module platform and at least one chiller module wall;
   the second functional chiller system component having at least one first pump module having a first pump module platform, a plurality of first pump module pumps, and at least one wall, at least one second pump module having a second pump module platform, a plurality of second pump module pumps, and at least one second pump module wall; and at least one plurality of chiller modules each chiller module having a chiller module platform and at least one chiller module wall;
   wherein the plurality of first pump module pumps of each of the first functional chiller system and second functional chiller system have a common first pump module inlet header and a common first pump module outlet header and the plurality of second pump module pumps each of the first functional chiller system and second functional chiller system have a common second pump module inlet header and a common second pump module outlet header,
   wherein the first pump module platform, the second pump module platform, and the chiller module platform of each of the first functional chiller system and second functional chiller system are separate,
   wherein the at least one first pump module wall, the at least one second pump module wall, and the chiller module walls of the first functional chiller system component collectively form a perimeter wall around at least a portion of the first functional chiller system component, and
   wherein the at least one first pump module wall, the at least one second pump module wall, and the chiller module walls of the second functional chiller system component collectively form a perimeter wall around at least a portion of the second functional chiller system component.

8. The chiller plant of claim 7, further comprising a controller configured to determine a required amount or temperature of chilled water; determine a number of chiller modules, first pump modules, and second pump modules to produce the required amount or temperature of chilled water; and select one or more of the chiller modules, one or more of the first pump modules, and one or more of the second pump modules to produce the required amount or temperature of chilled water.

9. The chiller plant of claim 8, wherein the controller selects one or more of the chiller modules, one or more of the first pump modules, and one or more of the second pump modules from only one of the first functional chiller system component or second functional chiller system component.

10. The chiller plant of claim 8, wherein the controller selects one or more of the chiller modules, one or more of the first pump modules, and one or more of the second pump modules from each of the first functional chiller system component and second functional chiller system component.

11. A system for cooling air comprising a coil and a chilling water circuit, wherein the chilled water is provided to the chilling water circuit using the chiller plant of claim 1.

12. A method of assembling a chiller plant comprising:
    providing a first pump module having a first pump module platform, a plurality of first pump module pumps, and at least one first pump module wall;

providing a plurality of chiller modules, arranged and piped in parallel, each having a chiller module platform and at least one chiller module wall adjacent to the first pump module;

providing a second pump module having a second pump module platform, a plurality of second pump module pumps, and at least one second pump module wall adjacent to the chiller module;

wherein the plurality of first pump module pumps have a common first pump module inlet header and a common first pump module outlet header, the plurality of second pump module pumps have a common second pump module inlet header and a common second pump module outlet header, wherein the plurality of chiller modules are configured to be fluidly connected in parallel via a common chilled water evaporator outlet header to the first pump module and fluidly connected in parallel via a common cooling water condenser inlet header to the second pump module, wherein the first pump module platform, the second pump module platform, and the chiller module platform are separate, and wherein the at least one first pump module wall, the at least one second pump module wall, and the chiller module wall collectively form a perimeter wall around at least a portion of the chiller plant.

13. The method of claim 12, wherein the at least one first pump module wall, the at least one second pump module wall, and each of the at least one chiller module walls collectively form a perimeter wall around the entire chiller plant.

14. The method of claim 12, further comprising placing the first pump module, the plurality of chiller modules, and the second pump module side-by-side and affixing the first pump module, the plurality of chiller modules, and the second pump module together.

15. The method of claim 12, further comprising connecting the chiller plant to a chilling circuit for providing chilled water to a coil.

16. The method of claim 15, after providing the first pump module, the plurality of chiller modules, and second pump module, connecting the first pump module to the plurality of chiller modules, and connecting the second pump module to the first pump module.

17. The chiller plant of claim 1, wherein the chiller plant does not include any walls between the first pump module, the second pump module, and the plurality of chiller modules such that a common and contiguous machine room is formed.

18. The chiller plant of claim 1, wherein the first pump module is located in direct contact with and on a first end of the plurality of chiller modules and the second pump module is located in direct contact with and at the other end of the plurality of chiller modules.

19. The chiller plant of claim 1, wherein the common chilled water evaporator outlet header is fluidly connected to the common first pump module inlet header, and wherein the common cooling water condenser inlet header is fluidly connected to the common second pump module outlet header.

20. The chiller plant of claim 1, wherein each of the plurality of first pump module pumps is provided with an isolation valve at the common first pump module inlet header and the common first pump module outlet header and each of the plurality of second pump module pumps is provided with an isolation valve at the common second pump module inlet header and the common second pump module outlet header such that each of the plurality of first pump module pumps and each of the plurality of second pump module pumps are configured to be selectively isolated.

* * * * *